US005349387A

United States Patent [19]

Fan Chiang et al.

[11] Patent Number: 5,349,387

[45] Date of Patent: Sep. 20, 1994

[54] APPARATUS FOR DETECTING POLARITY OF AN INPUT SIGNAL

[75] Inventors: Yung F. Fan Chiang; Kun M. Lee, both of Taoyuan, Taiwan

[73] Assignee: Acer Peripherals, Inc., Taiwan

[21] Appl. No.: 124,780

[22] Filed: Sep. 21, 1993

[51] Int. Cl.[5] ........................ H04N 5/04; H04N 5/08; H04N 5/10

[52] U.S. Cl. .................................... 348/525; 348/529; 348/531

[58] Field of Search ............... 358/148, 150, 153, 154, 358/160; 328/118, 140; 307/517, 518, 262, 231; 382/22; H04N 5/04, 5/25, 5/06, 5/08, 5/10

[56] References Cited

U.S. PATENT DOCUMENTS 4,387,396 6/1983 Tanaka et al. ...................... 358/154

FOREIGN PATENT DOCUMENTS 0014259 1/1982 Japan .................................. 358/148
0080064 5/1984 Japan .................................. 358/154
0012870 1/1985 Japan ............................ H04N 5/10
0012683 1/1989 Japan ............................ H04N 6/10
0250977 11/1991 Japan ............................ H04N 5/10
4229778 8/1992 Japan ............................ H04N 5/10

*Primary Examiner*—James J. Groody
*Assistant Examiner*—Michael H. Lee
*Attorney, Agent, or Firm*—Robbins, Berliner & Carson

[57] ABSTRACT

The apparatus of the invention includes an edge detection circuit, a divide-by-N circuit and a latch. The edge detection circuit, responsive to an edge of the input signal, generates a trigger signal of a first frequency. The divide-by-N circuit inputs the trigger signal and generates a latch signal of a second frequency. The second frequency is equal to the first frequency divided by N. The latch inputs the input signal, and responsive to the latch signal, latches the input signal and outputs a polarity value representative of the polarity of the input signal.

6 Claims, 1 Drawing Sheet

APPARATUS FOR DETECTING POLARITY OF AN INPUT SIGNAL

BACKGROUND OF THE INVENTION

The present invention relates to a polarity detection apparatus, and in particular relates to an apparatus lot detecting polarity of a video synchronization signal.

Typically, a video display device, e.g. a monitor, has a plurality of display modes. In general, the frequency and the polarity of the horizontal and vertical synchronization signals are used to enable a particular mode of display.

In accordance with tile conventional approach, there are two methods for detecting the polarity of tile video synchronization signals.

The first method uses a resistor-capacitor integration circuit to integrate the video synchronization signal concerned. The output of the integration is ted to a transistor switch and tile output value of the transistor switch has the representation of the polarity of the sychronization signal. However, this kind of circuit is not easily fabricated on an integrated circuit since the presence of the capacitor. Furthermore, when this method is implemented on an integrated circuit, two pins have to be reserved for the detection of the polarity of the horizontal and vertical synchronization signals. It is not a cost effective method.

The second method uses a software of a microprocessor in a monitor control circuit. At a plurality of time points which are equally spaced apart within a predetermined time interval, The microprocessor detects the voltage level of the synchronization signal at each time point. If the number of the positive voltage level is less than that of the negative voltage level, a positive polarity of the synchronization signal is determined. It the number of the negative voltage level is less than that of the positive voltage level, a negative polarity of the synchronization signal is determined. However, this method uses a part of processor time and downgrades the performance of the processor and the video system.

SUMMARY OF THE INVENTION

Therefore, the invention provides an apparatus for detecting polarity of an input signal which is easily implemented on an integrated circuit.

The apparatus of the invention includes an edge detection circuit, a divide-by-N circuit and a latch. The edge detection circuit, responsive to an edge of the input signal, generates a trigger signal of a first frequency. The divide-by-N circuit, inputing the trigger signal, generates a latch signal of a second frequency. The second frequency is equal to the first frequency divided by N. The latch, inputing the input signal and in response to the latch signal, latches the input signal and outputs a polarity value representative of the polarity of the input signal.

The invention will be further understood through the following detailed description of the preferred embodiment of the invention together with the appended drawings.

BRIEF DESCRIPTIONS OF THE DRAWINGS

DETAILED DESCRIPTION OF THE PREFERRED EMBODIMENT

Figure 1:
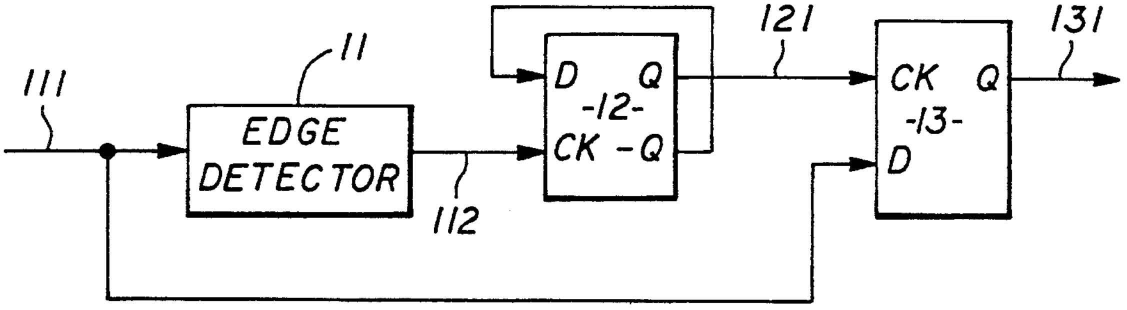
FIG. 1 shows one preferred embodiment in accordance with the invention.

Referring to FIG. 1, tile invention includes a edge detection circuit 11, a divide-by-N circuit 12 and a latch 13.

Figure 2A:
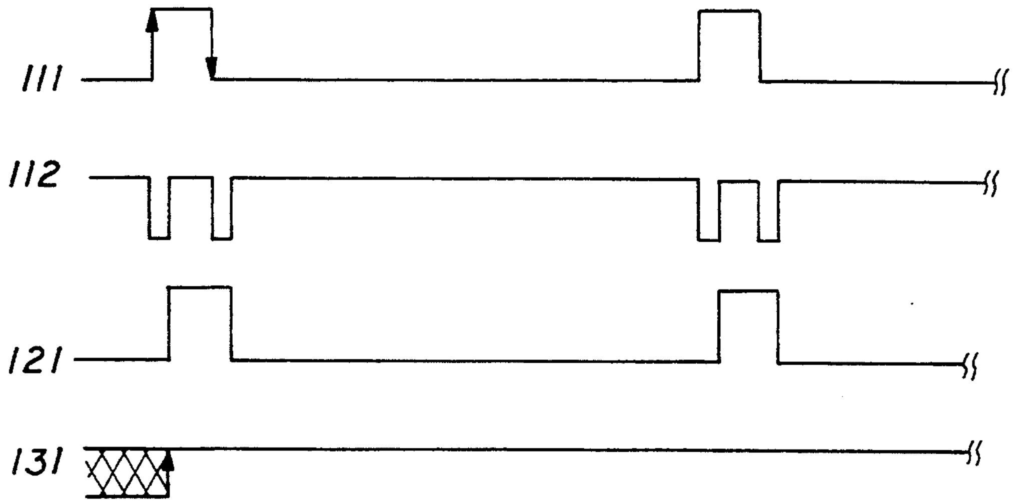
FIGS. 2(*a*–*b*) shows the timing relationship of the signals in FIG. 1.
Figure 2B:
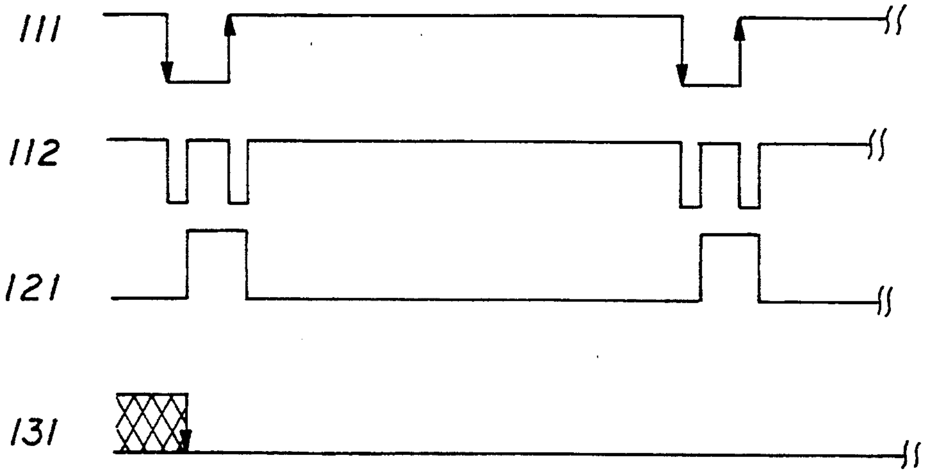

The edge detection circuit 11, in response to a positive-going or negative-going edge of the input signal 111, generates a trigger signal 112 with tile timing relationship shown in FIG. 2. That is, when positive-going edge is occurred, the trigger signal 112 is activated and when the negative-going edge is occurred, the trigger signal 112 is activated again.

The divide-by-N circuit 12 inputs tile trigger signal 112 and generates a latch signal 121 with a frequency equal to that of the trigger signal 112 divided by N. In one embodiment of the invention, the divide-by-N circuit 12 is a divide-by-2 circuit. The timing relationship of signal 112 and signal 121 is shown in FIG. 2. It is shown that as the trigger signal 112 are activated twice, the latch signal 121 is activated once.

The latch 13 inputs the input signal 111 and, in response to the latch signal 121, latches the input signal 111 and outputs a polarity value 131 representing the polarity of the input signal 111, as depicted in FIG. 2.

FIG. 2(*a*) shows the signal relationship when the polarity of the input signal 111 is positive and FIG. 2(*b*) shows the signal relationship when the polarity of the input signal 111 is negative.

The divide-by-2 circuit 12 is a flip-flop as shown in accordance with one preferred embodiment. The flip-flop has a clock input terminal for receiving tile trigger signal 112 and first output terminal (Q) outputing the latch signal 121. The flip-flop has a data terminal and a second output terminal (-Q) coupled to each other.

The latch 13 is a flip-flop according to one preferred embodiment. The flip-flop has a data terminal receiving the input signal 111 and a clock input terminal inputing the latch signal 121. The flip-flop has an output terminal outputing the polarity value 131.

In a video system application, the horizontal or vertical synchronization signal is input to the apparatus of the invention as the input signal 111.

What is claimed is:

1. All apparatus for detecting a polarity of an input signal, comprising:

edge detection means, responsive to an edge of said input signal, for generating a trigger signal of a first frequency;

divide-by-N means, inputing said trigger signal, for generating a latch signal of a second frequency, the second frequency being equal to tile first frequency divided by N;

latch means, inputing said input signal and in response to said latch signal, for latching said input signal and outputing a polarity value representative of the polarity of said input signal.

2. The apparatus as recited in claim 1, wherein the divide-by-N means comprising:

a flip-flop, having a clock input terminal for inputing said trigger signal, a first output terminal (Q) for outputing said latch signal, a data input terminal and a second output terminal (-Q), the data input terminal and the second output terminal being coupled to each other.

3. The apparatus as recited in claim 1, wherein the latch means comprising:

a flip-flop, having a data terminal for inputing said input signal, a clock input terminal for inputing said latch signal and an output terminal for outputing said polarity value.

4. The apparatus as recited in claim 1, wherein the input signal being a horizontal synchronization signal of a video system.

5. The apparatus as recited in claim 1, wherein the input signal being a vertical synchronization signal of a video system.

6. The apparatus as recited in claim 1, wherein the N being equal to 2.

* * * * *